United States Patent Office 3,634,324
Patented Jan. 11, 1972

3,634,324
POLYMERS PREPARED FROM PHENOLS, AROMATIC DIAMINES AND AROMATIC DIANHYDRIDES
Maurice Ducloux, Lyon, and Max Gruffaz, La Mulatiere, France, assignors to Rhone-Poulenc S.A., Paris, France
No Drawing. Filed July 2, 1969, Ser. No. 838,694
Claims priority, application France, July 3, 1968, 157,757
Int. Cl. C08g 20/32
U.S. Cl. 260—47 CP
9 Claims

ABSTRACT OF THE DISCLOSURE

New heat-stable resins are prepared by curing prepolymers of a phenol an aromatic di-primary diamine and a dianhydride of azobenzenetetracarboxylic or azoxytetracarboxylic acid, said polymers being useful in the production of homogeneous or composite moulded objects.

---

The present invention relates to heat-stable resins and to processes for their preparation.

French patent specification No. 1,456,238 has described linear polyimides derived from a di-primary diamine and a dianhydride of azobenzenetetracarboxylic acid. These polyimides are intensely red in colour and can be used to produce varnishes, particularly varnishes for application to metallic yarns, as well as to produce films and foils.

New heat-stable resins have now been discovered which are particularly suitable for use in the production of homogenous or composite moulded objects possessing excellent mechanical properties and having a remarkable resistance to prolonged exposure to intense heat.

Thus the present invention provides a process for preparing a resin which comprises first forming a prepolymer by heating together at 100° to 400° C. a dianhydride of azobenzenetetracarboxylic acid or of azoxybenzenetetracarboxylic acid, a diprimary diamine and a phenol, and then heating the prepolymer with a curing agent at above 200° C.

The phenols which may be used particularly include, phenol, cresols, pyrocatechol, resourcinol, hydroquinone, hydroanthraquinone, 1,2,3-, 1,3,5- or 1,2,4-trihydroxybenzene, trimethylolphenol, naphthols, dihydroxybiphenyls, bis(4 - hydroxyphenyl) methane, and 2,2-bis(4 - hydroxyphenyl) propane.

The diamines which can be used may be represented by the formula $$H_2N—Z—NH_2 \quad (I)$$

in which Z represents a phenylene or naphthylene radical or several phenylene radicals joined directly or by a divalent atom such as sulphur or oxygen or by a divalent group such as an alkylene radical with 1 to 3 carbon atoms,

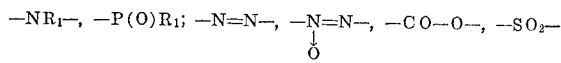

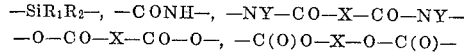

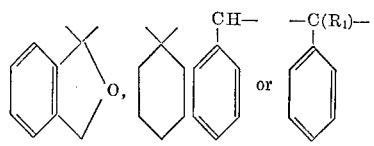

and $R_1$, $R_2$ and Y may be the same or different, and each represents an alkyl radical having 1 to 4 carbon atoms, a cycloalkyl radical having 5 or 6 membered ring or a phenyl radical, and X represents a linear or branched alkylene radical having 2 to 12 carbon atoms, a cycloalkylene radical having 5 or 6 membered ring or a phenylene radical.

These diamines include for example, 4,4'-diamino-diphenylmethane, benzidine, 4,4'-diaminodiphenylsulphide, 4,4'-diaminodiphenylsulphone, 4,4'-diaminodiphenyl ether, 1,5-diaminonaphthalene, m-phenylenediamine, p-phenylenediamine, m-xylylenediamine, p-xylylenediamine, 1,1-bis(p-aminophenyl) phthalane, bis(4-aminophenyl) phenylamine, bis(4-aminophenyl)phosphine oxide and bis(4-aminophenyl)diphenylsilane.

The term "curing agent" where used herein refers to chemical agents which react with the prepolymers to cause cross-linking, lengthening of the polymer chains, or branch formation.

The curing agent used may for example be a dianhydride, polyamine or polyisocyanate but is preferably a dianhydride of a tetracarboxylic acid such a pyromellitic anhydride or a dianhydride of formula:

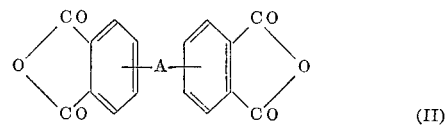

in which A represents a divalent atom such as oxygen or sulphur or a divalent group such as an alkylene radical having 1 to 3 carbon atoms,

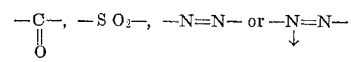

The dianhydrides which can be used include pyromellitic anhydride, the dianhydride of bis(3,4-dicarboxyphenyl) methane, the dianhydride of bis(3,4-dicarboxyphenyl) propane, the dianhydride of bis(3,4-dicarboxyphenyl)sulphone, the dianhydride of 3,3',4,4' - benzophenonetetracarboxylic acid, and the dianhydrides of 3,3',4,4'-azobenzenetetracarboxylic acid and 3,3',4,4'-azoxybenzenetetracarboxylic acid.

The molar ratio of diamine to dianhydride used in generally 0.3 to 0.8, preferably 0.5 to 0.7.

The amount of phenol employed is such that the molar ratio of phenol/dianhydride is greater than 0.5 and preferably greater than 1. There is however no critical upper limit.

The prepolymer can be prepared by heating a mixture of the dianhydridediamine and phenol in a solvent medium, the reaction temperature being 100 to 400° C., preferably 140 to 250° C. It is frequently advantageous to carry out the reaction under reflux.

The solvents which may be used include halogenated or nonhalogenated aliphatic or aromatic hydrocarbons, ethers, ketones, esters, amides, sulphoxides and sulphones. When the phenol used as a reagent has a relatively low melting point, it is preferable to use an excess of the phenol as the solvent.

The process may be carried out under superatmospheric or subatmospheric pressures but it is preferably carried out under atmospheric pressure.

The progress of the reaction can easily be checked by measuring the amount of water eliminated.

The prepolymer may also be prepared by reacting the diamine with the dianhydride according to any known method until they have partially or completely formed an imide, and then heating the reaction product with the phenol under the conditions described above, i.e. in a solvent medium at a temperature of 100 to 400° C., preferably 140 to 250° C.

Whatever method is used to prepare the prepolymer it can then be isolated from the final mixture by the usual processes, for example by removing the solvent or precipitating the prepolymer using a non-solvent such as an aliphatic ketone or a hydrocarbon.

Before curing the propolymer it is advantageous to modify it by dissolving it in an aqueous ammonia solution to dryness. Commercial ammonia solutions, i.e., solutions having a density of the order of 0.9, can for example be used for this treatment.

The resins of the present invention may be obtained by heating an intimate mixture of the prepolymer, optionally modified with ammonia, with the curing agent to a temperature above 200° C., preferably 250° C. to 350° C., under pressure where necessary. When the prepolymer is modified with ammonia, this mixing can advantageously be achieved by adding the curing agent to the ammoniacal solution of the precursor, homogenising the mixture and then evaporating it to dryness.

The amount of curing agent used is generally 0.05 to 4 mols, preferably 0.4 to 1.5 mols per mol of dianhydride used in the preparation of the polymer. These values are given for difunctional curing agents (for example dianhydrides, diamines or diisocyanates). When other curing agents are used the abovementioned amounts must be modified in inverse proportion to the number of functions of groups of one molecule of curing agent.

Shaped objects may be made by shaping the mixture under pressure for at least a part of the heating process. The pressure used is usually greater than 5 bars and advantageously greater than 10 bars. If the softening point of the curing agent-prepolymer mixture is higher than the heating temperature then in practice the higher the difference between these two temperatures the higher the pressure used.

Finally, it is possible to add various fillers to the mixture of prepolymer and curing agent so as to obtain heat-stable filled resins. Suitable fillers include, graphite, mica, boron nitride, silica, alumina and glass or asbestos fibres.

The following examples illustrate the invention.

The flexural breaking strength tests were carried out according to Standard Specification ASTM D 790–63, an 10 mm. wide samples, with the span or distance between the supports on which the samples rested during these tests being 50 mm. in the case of laminates and 25.4 mm. in the case of mouldings.

EXAMPLE 1

A mixture containing 60 g. of azophthalic anhydride, 10 g. of m-phenylenediamine, 94 g. of phenol and 50 ml. of benzene is heated for 2 hours to 60° C. in a 500 ml. reactor fitted with a column provided with a packing and topped by a Dean and Stark apparatus. The mixture is then gradually heated to about 180° C. and kept at this temperature for 4 hours, during which time the water formed is removed as a binary water-benzene azeotrope. 6.6 g. of water are thus removed.

The phenol is removed by heating under reduced pressure (1 mm. of mercury). 95 g. of a powder A, softening point about 250° C. are thus obtained.

11.5 g. of powder A and 3.6 g. azophthalic anhydride are dissolved with stirring in 61 g. of aqueous ammonia (d=0.92) at 25° C. This solution is used to impregnate 16 samples (8 cmf. x 9 cm.) of woven glass fabric of the satin type, having a specific weight of 308 g./m.$^2$ and which has been desized by heating and treated with $\gamma$-aminopropyltriethoxysilane. These samples are then dried at 120° C. in a ventilated atmosphere for 1 hour and then for 2 hours under reduced pressure (15 mm. of mercury).

The samples are stacked and the assembly is heated to 330° C. for 2 minutes under a pressure of 1 bar and then for 3 hours under a pressure of 32 bars. The laminate obtained is 0.3 mm. thick and contains 13% by weight of resin. Its flexural breaking strength is 60.4 kg./mm.$^2$; after it has been kept at 300° C. for 192 hours, the flexural breaking strength is 17.9 kg./mm.$^2$.

EXAMPLE 2

An ammoniacal solution of azophthalic anhydride and powder A prepared as described in Example 1 is prepared and this solution evaporated. 3.2 g. of the resulting residue are intimately mixed with 12.8 g. of powdered mica (particle size about 5$\mu$). The mixture is introduced into a cylindrical mould of 5 cm. diameter, and heated to 350° C. for 1 hour under a pressure of 200 bars. A disc 4 mm. thick is obtained. Its flexural breaking strength is 6.62 kg./mm.$^2$. After the disc has been kept at 300° C. for 120 hours in an air-ventilated oven, its flexural breaking strength is 3.64 kg./mm.$^2$.

EXAMPLE 3

A mixture of 200 g. of azophthalic anhydride, 33 g. of m-phenylenediamine and 903 g. of phenol is heated at 60° C. for 2 hours and then at 175 to 180° C. for 4 hours. 21.6 g. of water are removed during this preparation. After removal of the phenol by distillation, 314 g. of powder A, softening point about 250° C., are obtained.

30 g. of this powder A are then dissolved with stirring in 70 g. of aqueous ammonia (d=0.92) at 25° C. The resultant solution is evaporated under a stream of air at 50° C. and then under a pressure of 15 mm. of mercury at 100° C. The resulting residue is intimately mixed with 19.1 g. of azophthalic anhydride and the mixture heated to 300° C. in vacuo for 9 hours. A powder B, softening point about 410° C., is obtained. After being ground and sieved, 25.6 g. of powder B are introduced into a cylindrical mould 7.6 cm. diameter.

The whole is heated to 300° C. in 45 minutes under a pressure of 1 bar, and then for 1 hour at 300° C. under a pressure of 200 bars. The assembly is cooled and then heated under nitrogen at atmospheric pressure while the temperature is gradually raised from 25 to 300° C. over 55 hours, and then maintained at 300° C. for 72 hours.

A moulding having a flexural breaking strength of 5.38 kg./mm.$^2$ is obtained. After the moulding has been kept for 236 hours at 300° C. this strength is 5.85 kg./mm.$^2$; after 500 hours at 300° C. it is 5.98 kg./mm.$^2$ and after 1142 hours at 300° C. it is 5.90 kg./mm.$^2$.

EXAMPLE 4

A mixture of 300 g. of azophthalic anhydride, 50 g. of m-phenylenediamine and 1718 g. of phenol is treated as described in Example 1.

32 g. of water are removed and 485 g. of powder A, softening point about 245° C., are obtained.

200 g. of powder A are intimetely mixed with 124 g. of azophthalic anhydride. The mixture is heated to 300° C. under nitrogen for about 2 hours. After grinding and sieving, a powder B, softening point about 430° C., is obtained.

25.6 g. of powder B are introduced into a cylindrical mould 7.6 cm. in diameter and heated so that the temperature is raised from 25 to 345° C. in 17 minutes while the pressure is 1 bar, and then maintained at 345° C. for 10 minutes while the pressure is 200 bars. The process is finished by heating the assembly under nitrogen at atmospheric pressure for 168 hours at 300° C. and then at 340° C. for 75 hours.

The flexural breaking strength of the resulting moulding is 15.7 kg./mm.$^2$. After the moulding has been kept for 504 hours at 300° C. it is 11.0 kg./mm.$^2$ and after 1008 hours at 300° C. it is 7.1 kg./mm.$^2$.

EXAMPLE 5

100 g. of powder A prepared as described in Example 4 are intimately mixed with 93 g. of azophthalic anhydride. The mixture is subjected to a heat treatment at 300° C. under nitrogen for 2 hours. After grinding and sieving, a powder B with a softening point of about 425° C. is obtained.

25.6 g. of this powder B are introduced into a cylindrical mould 7.6 cm. in diameter and heated so that the temperature is raised from 25 to 365° C. in 17 minutes while the pressure exerted is 1 bar and then maintained at 365° C. for 10 minutes while the pressure is 200 bars and then maintained for 168 hours at 300° C. under nitrogen at atmospheric pressure.

A moulding having a flexural breaking strength of 10.1 kg./mm.² is obtained. After the moulding has been kept at 300° C. for 504 hours it is 11.6 kg./mm.², after 1008 hours at 300° C. it is 8.0 kg./mm.² and after 1512 hours at 300° C. it is 3.8 kg./mm.².

EXAMPLE 6

A mixture of 200 g. of azophthalic anhydride, 41.8 g. of m-phenylenediamine and 1173 g. of phenol is treated as described in Example 1.

2.1 g. of water are removed and 312 g. of powder A, softening point about 245° C., are obtained.

50 g. of powder A and 29.8 g. of azophthalic anhydride are intimately mixed. The mixture is heated at about 310° C. for 1 hour. After grinding and sieving, a powder B, softening point about 415° C., is obtained.

25.6 g. of powder B are introduced into a cylindrical mould 7.6 cm. in diameter and heated so that the temperature is raised from 25 to 365° C. in 18 minutes while a pressure of 1 bar is exerted and then maintained at 365° C. for 10 minutes while the pressure is 200 bars.

The process is finished by heating the assembly for 96 hours at 320° C. at atmospheric pressure under nitrogen.

The moulding obtained has a flexural breaking strength of 12.8 kg./mm.². After the moulding has been kept for 504 hours at 300° C. it is 10.1 kg./mm.² and after 1008 hours at 300° C. it is 7.0 kg./mm.².

EXAMPLE 7

70 g. of the powder A prepared as described in Example 6 are dissolved in 200 ml. of aqueous ammonia ($d=0.92$). The solution is evaporated as described in Example 3. The resulting residue is intimately mixed with 39.7 g. of azophthalic anhydride and then heat-treated at 310° C. under nitrogen for about one hour. After grinding and sieving, a powder B having a softening point of about 400° C., is obtained.

25.6 g. of powder B are introduced into a cylindrical mould 7.6 cm. in diameter and heated so that the temperature is raised from 25 to 365° C. in 18 minutes while the pressure exerted is 1 bar, then maintained at 365° C. for 10 minutes while the pressure is 200 bars and finally maintained at 300° C. for 120 hours at atmospheric pressure under nitrogen.

The resulting moulding has a flexural breaking strength of 10.5 kg./mm.². After the moulding has been kept at 300° C. for 504 hours it is 10.6 kg./mm.²; after 1008 hours at 300° C. it is 8.0 kg./mm.² and after 1512 hours at 300° C. it is 5.7 kg./mm.².

EXAMPLE 8

A mixture of 100 g. of azophthalic anhydride, 25 g. of m-phenylenediamine and 582 g. of phenol is treated as described in Example 1.

11.7 g. of water are removed and 160 g. of powder A, softening point about 240° C., are obtained.

This powder A is dissolved with stirring in 37.0 g. of aqueous ammonia ($d=0.92$) at 25° C. and the solution is then evaporated as described above. The residue is intimately mixed with 100 g. of azophthalic anhydride and the whole heated to about 300° C. for 3 hours. After grinding and sieving, a powder B, softening point about 430° C., is obtained.

25.6 g. of powder B are introduced into a cylindrical mould 7.6 cm. in diameter and heated so that the temperature is raised from 25 to 365° C. in 15 minutes while a pressure of 1 bar is exerted and then maintained for 10 minutes at 365° C. while the pressure is 200 bars. The process is finished by heating the assembly at 300° C. for 168 hours under nitrogen at atmospheric pressure. The resulting moulding has a flexural breaking strength of 13.8 kg./mm.². After the moulding has been kept at 300° C. for 1008 hours this strength is 6.5 kg./mm.².

EXAMPLE 9

A mixture of 396.6 g. of azophthalic anhydride, 66.2 g. of m-phenylene diamine and 1152 g. of phenol is heated for 1 hour at 60° C. and then for 4 hours at about 180° C.

The resulting solution is cooled to about 50° C. and run, over the course of 10 minutes, into a 10 litre flask containing 4 litres of acetone vigorously stirred using a turbine. The polymer which has precipitated is washed with acetone and then with a mixture of acetone and cyclohexene in a portion of ¼ by volume. After drying and grinding the polymer, 482 g. of a powder A, softening point about 280° C., are obtained.

100 g. of powder A are dissolved in 185 g. of aqueous ammonia ($d=0.92$) and the resultant solution is then evaporated at 80° C. in air and then under reduced pressure (15 m. of mercury). The resulting residue is intimately mixed with 64.5 g. of azophthalic anhydride and this mixture is heated to about 310° C. for 1 hour. After grinding and sieving of the product a powder B, softening point about 430° C., is obtained.

10 g. of this powder B are introduced into a cylindrical mould 5 cm. in diameter. The mould is heated so that the temperature is raised from 25 to 350° C. in 18 minutes while the pressure exerted is 1 bar and then maintained at 350° C. for 10 minutes while the pressure is 200 bars. The process is finished by heating the assembly at 300° C. for 100 hours in a nitrogen atmosphere.

The resulting moulding has a flexural breaking strength of 10.9 kg./mm.². After the moulding has been kept at 300° C. for 504 hours, this strength is 9.9 kg./mm.².

EXAMPLE 10

11 g. of powder A prepared as described in Example 9 and 7 g. of azophthalic anhydride are dissolved in 27 g. of aqueous ammonia ($d=0.92$). A laminate of the kind described in Example 1 is prepared from the resulting solution, the assembly being heated to 370° C. under 22 bars for 4 hours. The resulting laminate has a flexural breaking strength of 58 kg./mm.² at 25° C. and of 39 kg./mm.² at 400° C.

EXAMPLE 11

A mixture comprising 645 g. of azophthalic anhydride, 198 g. of 4,4'-diaminodiphenylmethane and 1078 g. of phenol is heated for 1 hour at 60° C., then the temperature is raised to 175° C. and finally, maintained at 175–180° C. for 4 hours.

The mixture is cooled to 100° C. and then gradually run into a mixture prepared from 3.5 l. of acetone and 3.5 l. of cyclohexane, with vigorous stirring. The prepolymer which precipitates is treated as described in Example 9 and 1157 g. of powder are finally obtained.

11 g. of this powder and 7 g. of azophthalic anhydride are dissolved in 27 g. of ammonia ($d=0.92$) and a laminate having a flexural breaking strength of 58 kg./mm.² at 25° C. and of 38 kg./mm.² at 400° C. is prepared from the resulting solution by the method described in Example 10.

EXAMPLE 12

A mixture consisting of 16.1 g. of azophthalic anhydride, 5 g. of 4,4'-diaminodiphenylether and 94 g. of phenol is heated for 1 hour at 60° C. and then for 4 hours at 180° C.

The excess phenol is then removed by distillation and 36 g. of powder are obtained. 11 g. of this powder and 7 g. of the dianhydride of 3,3'4,4'-benzophenonetetracarboxylic acid are dissolved in 27 g. of aqueous ammonia ($d=0.92$).

A laminate is prepared from the resulting solution by the method described in Example 10. This laminate has a flexural breaking strength of 55 kg./mm.² at 25° C. and of 45.3 kg./mm.² at 300° C. After exposure to a temperature of 300° C. for 200 hours the strength is still 18.7 kg./mm.² at 25° C.

EXAMPLE 13

A mixture consisting of 33.8 g. of azoxyphthalic anhydride, 12.4 g. of 4,4'-diaminodiphenylsulphone and 94 g. of phenol is treated as described in Example 1.

11 g. of the resulting powder and 9 g. of the dianhydride of bis(3,4-dicarboxyphenyl)methane are dissolved in 30 g. of aqueous ammonia ($d=0.92$) and a laminate is prepared from the resulting solution of the method described in Example 10. This laminate has a flexural breaking strength of 36.5 kg./mm.$^2$ at 25° C. and of 34 kg./mm$^2$. at 300° C.

EXAMPLE 14

A mixture consisting of 32.2 g. of azophthalic anhydride, 9.6 g. of 4,4'-diaminodiphenylmethane and 108 g. of m-cresol is treated as described in Example 1.

11 g. of the resulting powder and 5.9 g. azoxyphthalic anhydride are dissolved in 39 g. of aqueous ammonia ($d=0.92$) and a laminate is prepared from the resulting solution by the method described in Example 10. This laminate has flexural breaking strength of 48.2 kg./mm.$^2$ at 25° C. and of 38.9 kg./mm.$^2$ at 300° C. After exposure to a temperature of 300° C. for 200 hours this strength is still 17.6 kg./mm.$^2$.

We claim:

1. Process for preparing a resin which comprises first forming a prepolymer by heating together at 100° to 400° C. a dianhydride of azobenzenetetracarboxylic acid or of azoxybenzenetetracarboxylic acid, a diprimary aromatic diamine of the formula:

$$H_2N-Z-NH_2$$

in which Z represents a phenylene or naphthylene radical or several phenylene radicals joined directly or by an oxygen or sulphur atom or by a divalent group selected from the group consisting of an alkylene radical with 1 to 3 carbon atoms.

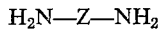

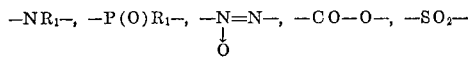

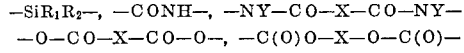

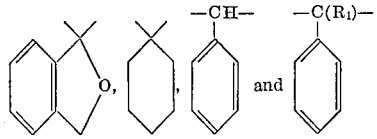

and R, R and Y may be the same or different, and each represents an alkyl radical having 1 to 4 carbon atoms, a cycloalkyl radical having a 5 or 6 membered ring or a phenyl radical, and X represents a linear or branched alkylene radical having 2 to 12 carbon atoms, a cycloalkylene radical having a 5 or 6 membered ring or a phenylene radical, and a phenol selected from the group consisting of phenol, a cresol, pyrocatechol, resorcinol, hydroquinone, hydroanthraquinone, 1,2,3-, 1,3,5- or 1,2,4-trihydroxybenzene, trimethylolphenol, a naphthol a dihydroxybiphenyl, bis(4-hydroxyphenyl)methane and 2,2-bis(4-hydroxy-phenyl)propane, the molar ratio of diamine to dianhydride being from 0.3 to 0.8 and the molar ratio of phenol to dianhydride being greater than 0.5, and then heating the prepolymer with, as curing agent, a dianhydride of an aromatic tetracarboxylic acid at above 200° C., the molar ratio of curing agent, based on a difunctional curing agent, to dianhydride used in the preparation of the prepolymer being from 0.05 to 4.

2. A process according to claim 1, in which the said dianhydride is first heated with the said diamine and the product is then heated with the phenol to produce the prepolymer.

3. A process according to claim 1, wherein the prepolymer is dissolved in aqueous ammonia and the solution is evaporated to dryness to give a modified prepolymer which is subsequently heated with the said curing agent.

4. A process according to claim 1, wherein the diamine is 4,4' - diamino - diphenylmethane, benzidine, 4,4' - diaminodiphenylsulphide, 4,4' - diaminodiphenylsulphone, 4' - diaminodiphenylether, 1,5-diaminodiphenylsulphone, phenylenediamine, p - phenylenediamine, m - xylylenediamine, p - xylylenediamine, 1,1 - bis(p - aminophenyl)-phthalane, bis(4-aminophenyl)phenylamino, bis(4-aminophenyl)phosphine oxide or bis(4-aminophenyl)diphenylsilane.

5. Process according to claim 1 wherein the diamine is m-phenylenediamine, the phenol is phenol and the curing agent is azophthalic anhydride.

6. A prepolymer prepared by heating a phenol selected from the group consisting of phenol; a cresol, pyrocatechol, resorcinol, hydroquinone, hydroanthraquinone, 1,2,3-, 1,3,5- or 1,2,4-trihydroxybenzene trimethylolphenol, a naphthol, a dihydroxy-biphenyl, bis(4-hydroxyphenyl)methane and 2,2-bis(4-hydroxyphenyl)-propane with a dianhydride of azobenzenetetracarboxylic or azoxybenzenetetracarboxylic acid and an aromatic bi-primary diamine of the formula:

$$H_2N-Z-NH_2$$

in which Z represents a phenylene or naphthylene radical or several phenylene radicals joined directly or by an oxygen or sulphur atom or by a divalent group selected from the group consisting of an alkylene radical with 1 to 3 carbon atoms,

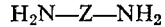

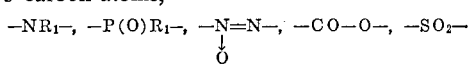

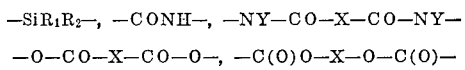

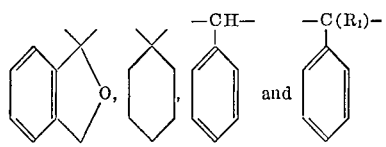

and $R_1$, $R_2$ and Y may be the same or different, and each represents an alkyl radical having 1 to 4 carbon atoms, a cycloalkyl radical having a 5 or 6 membered ring or a phenyl radical, and X represents a linear or branched alkylene radical having 2 to 12 carbon atoms, a cycloalkylene radical having a 5 or 6 membered ring or a phenylene radical, at a temperature of 100° to 400° C., the molar ratio of diamine to dianhydride being from 0.3 to 0.8 and the molar ratio of phenol to dianhydride being greater than 0.5.

7. A prepolymer according to claim 6 wherein the diamine is m-phenylenediamine and the phenol is phenol.

8. A prepolymer according to claim 6, prepared by reacting an aromatic bi-primary diamine or the formula:

$$H_2N-Z-NH_2$$

in which Z represents a phenylene or naphthylene radical or several phenylene radicals joined directly or by an oxygen or sulphur atom or by a divalent group selected from the group consisting of an alkylene radical with 1 to 3 carbon atoms,

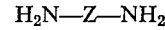

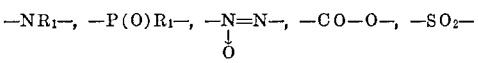

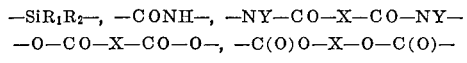

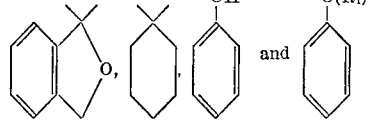

and $R_1$, $R_2$ and Y may be the same or different, and each represents an alkyl radical having 1 to 4 carbon atoms, a cycloalkyl radical having a 5 or 6 membered ring or a phenyl radical, and X represents a linear or branched alkylene radical having 2 to 12 carbon atoms, a cycloalkylene radical having a 5 or 6 membered ring or a phenylene radical, with a dianhydride of azobenzenetetracarboxylic or azoxy-benzenetetracarboxylic acid until they partially or completely form an imide and then heating the reaction product with a phenol selected from the group consisting of phenol, a cresol, pyrocatechol, resorcinol, hydroquinone, hydroanthraquinone, 1,2,3-, 1,3,5- or 1,2,4-trihydroxybenzene, trimethylolphenol a naphthol, a dihydroxybiphenyl, bis(4-hydroxyphenyl)methane and 2,2-bis(4-hydroxyphenyl)propane, at a temperature of 100° to 400° C., the molar ratio of diamine to dianhydride being from 0.3 to 0.8 and the molar ratio of phenol to dianhydride being greater than 0.5.

9. Process according to claim 1 wherein the anhydride of an aromatic tetracarboxylic acid is selected from the group consisting of the dianhydride of pyromellitic acid, the dianhydride of bis(3,4-dicarboxyphenyl)methane, the dianhydride of bis(3,4-dicarboxyphenyl)propane, the dianhydride of bis(3,4-dicarboxyphenyl sulphone, the dianhydride of 3,3',4,4'-benzophenonetetracarboxylic acid, and the dianhydrides of 3,3(,4,4'-azobenzenetetracarboxylic acid and 3,3',4,4'-azoxybenzenetetracarboxylic acid.

References Cited
UNITED STATES PATENTS

| | | | |
|---|---|---|---|
| 3,437,636 | 4/1969 | Angelo | 260—47 |
| 3,445,879 | 7/1969 | Gay et al. | 260—47 |
| 3,476,705 | 11/1969 | Hansen | 260—47 |

HAROLD D. ANDERSON, Primary Examiner

L. L. LEE, Assistant Examiner

U.S. Cl. X.R.

161—192; 260—37 N, 78 TF, 78.4 R, 78.4 D, 29.2 N